(12) United States Patent
Song et al.

(10) Patent No.: US 11,703,478 B2
(45) Date of Patent: Jul. 18, 2023

(54) MICRO TOTAL ANALYSIS SYSTEM, OPERATING METHOD AND MANUFACTURING METHOD THEREOF

(71) Applicant: BOE TECHNOLOGY GROUP CO., LTD., Beijing (CN)

(72) Inventors: Xiaoxin Song, Beijing (CN); Feng Zhang, Beijing (CN); Wenqu Liu, Beijing (CN); Zhijun Lv, Beijing (CN); Liwen Dong, Beijing (CN); Zhao Cui, Beijing (CN); Detian Meng, Beijing (CN); Libo Wang, Beijing (CN); Qi Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 489 days.

(21) Appl. No.: 16/957,614

(22) PCT Filed: Jul. 18, 2019

(86) PCT No.: PCT/CN2019/096511
§ 371 (c)(1),
(2) Date: Jun. 24, 2020

(87) PCT Pub. No.: WO2021/007844
PCT Pub. Date: Jan. 21, 2021

(65) Prior Publication Data
US 2023/0003688 A1    Jan. 5, 2023

(51) Int. Cl.
*G01N 29/02* (2006.01)

(52) U.S. Cl.
CPC ... *G01N 29/022* (2013.01); *G01N 2291/0228* (2013.01)

(58) Field of Classification Search
CPC .................. G01N 29/022; G01N 2291/0228
See application file for complete search history.

(56) References Cited

U.S. PATENT DOCUMENTS

2014/0125359 A1* 5/2014 El-Gamal ............... G01L 9/12
324/664
2016/0349253 A1* 12/2016 Kumar ............. G01N 33/54386
(Continued)

FOREIGN PATENT DOCUMENTS

CN      102896007 A        1/2013
CN      107102058 A  *    8/2017     ........... G01N 29/022
(Continued)

*Primary Examiner* — Francis C Gray
(74) *Attorney, Agent, or Firm* — Brooks Kushman P.C.

(57) ABSTRACT

A micro total analysis system, operating method and manufacturing method thereof are provided. The micro total analysis system includes at least one micro total analysis unit each including: microfluidic device including first electrode and dielectric layer connected to each other, where the dielectric layer drives to-be-measured droplet to move based on voltage of the first electrode; and acoustic wave detection device including second electrode connected to the dielectric layer, where the dielectric layer is also used as transducer of the acoustic wave detection device, and configured to generate acoustic wave toward the droplet based on voltage of the second electrode, and generate a detection result corresponding to the droplet based on received acoustic wave. The micro total analysis system, the operating method and the manufacturing method thereof enables the microfluidic device and the acoustic wave detection device to be integrated in the same chip.

16 Claims, 5 Drawing Sheets

(56) References Cited

U.S. PATENT DOCUMENTS

2018/0126381 A1\* 5/2018 Huff ................ G01N 33/54366
2019/0366332 A1\* 12/2019 Zhang ............... B01L 3/502792

FOREIGN PATENT DOCUMENTS

CN  109731621 A  5/2019
CN  109954526 A  7/2019

\* cited by examiner

MICRO TOTAL ANALYSIS SYSTEM, OPERATING METHOD AND MANUFACTURING METHOD THEREOF

CROSS-REFERENCE TO RELATED APPLICATION

This application is the U.S. national phase of PCT Application No. PCT/CN2019/096511 filed on Jul. 18, 2019, which is incorporated herein by reference in its entirety.

TECHNICAL FIELD

The present disclosure relates to the field of microfluidic technology, and in particular to a micro total analysis system, an operating method and a manufacturing method thereof.

BACKGROUND

A micro total analysis system (micro TAS) is for maximizing, based on micromation and integration of chemical analysis device, the transfer of functions of an analytical laboratory to a portable analysis device, or even to a chip with a size in units of square inches, which is the most concentrated expression of the idea of transferring functions of the analytical laboratory to the chip. The micro total analysis system requires the integration of a microfluidic platform and a detection sensor.

SUMMARY

A micro total analysis system, an operating method and a manufacturing method thereof are provided according to the present disclosure.

In a first aspect, the present disclosure provides a micro total analysis system, including at least one micro total analysis unit, where each of the at least one micro total analysis unit includes:

a microfluidic device, including a first electrode and a dielectric layer connected to each other, where the dielectric layer is configured to drive, based on a voltage of the first electrode, a to-be-measured droplet to move; and an acoustic wave detection device, including a second electrode connected to the dielectric layer, where the dielectric layer is further used as a transducer of the acoustic wave detection device, and is configured to generate an acoustic wave toward the to-be-measured droplet based on a voltage of the second electrode, and generate a detection result corresponding to the to-be-measured droplet based on a received acoustic wave.

Further, the micro total analysis unit includes a hydrophobic layer, the hydrophobic layer is on a side of the dielectric layer facing the to-be-measured droplet, and the hydrophobic layer is used for contacting the to-be-measured droplet.

Further, the hydrophobic layer includes a through hole provided in a detection region, a third electrode connected to the dielectric layer is provided in the through hole, and the third electrode is configured to cause the acoustic wave generated by the dielectric layer to be transmitted to a part of the to-be-measured droplet, where the part of the to-be-measured droplet is in the detection region.

Further, the micro total analysis unit includes a deceleration layer on a side of the third electrode facing the to-be-measured droplet, and the deceleration the layer is configured to reduce a movement speed of the to-be-measured droplet on the deceleration layer.

Further, the micro total analysis unit includes an organic layer and a passivation layer arranged in sequence on a side of the first electrode facing away from the to-be-measured droplet, a groove is provided in the passivation layer at a position corresponding to the detection region, and the groove is filled with the organic layer.

Further, a width of the groove ranges from 3 millimeters to 5 millimeters, and a depth of the groove ranges from 0.1 microns to 1 microns.

Further, the quantity of the micro total analysis unit is plural, the multiple micro total analysis units are arranged in an array, and a distance between centers of two adjacent grooves is less than or equal to half of a wavelength of the acoustic wave.

Further, a thickness of the organic layer is greater than 10 microns.

Further, a frequency of the acoustic wave ranges from 25 kHz to 40 kHz, and a wavelength of the acoustic wave ranges from 8.5 millimeters to 13.6 millimeters.

Further, the quantity of the micro total analysis unit is plural, the multiple micro total analysis units are arranged in an array, and the quantity of the transducers simultaneously covered by one to-be-measured droplet is greater than or equal to 6.

Further, a dielectric constant of the dielectric layer is greater than 9.

In a second aspect, the present disclosure provides an operating method for the micro total analysis system as described above, the operating method including:

controlling, via the first electrode, the dielectric layer to drive the to-be-measured droplet to move;

controlling, in a first time period, via the second electrode, the dielectric layer to generate the acoustic wave toward the to-be-measured droplet; and receiving the detection result in a second time period, where the detection result is generated by the dielectric layer based on the received acoustic wave and is corresponding to the to-be-measured droplet.

Further, the operating method is applied to the micro total analysis system as described above, the controlling, via the first electrode, the dielectric layer to drive the to-be-measured droplet to move, includes:

controlling, via the first electrode, the dielectric layer to drive the to-be-measured droplet on the hydrophobic layer to move to the detection region; and the controlling, via the second electrode, the dielectric layer to generate the acoustic wave toward the to-be-measured droplet, includes:

controlling, via the second electrode, the dielectric layer to generate the acoustic wave; and controlling the third electrode to cause the acoustic wave generated by the dielectric layer to be transmitted to a part of the to-be-measured droplet, where the part of the to-be-measured droplet is in the detection region.

In a third aspect, the present disclosure provides a method for manufacturing a micro total analysis system, including:

forming multiple functional films on a base substrate;

forming a first electrode and a second electrode on the multiple functional films, where the first electrode and the second electrode are arranged in a same layer; and forming a dielectric layer covering the first electrode and the second electrode, where the dielectric layer is connected to the first electrode and the second electrode.

Further, after the forming the dielectric layer covering the first electrode and the second electrode, the method includes:

forming a third electrode in a detection region on the dielectric layer, where the third electrode is connected to the dielectric layer; and forming a hydrophobic layer covering the dielectric layer and the third electrode, and removing a part of the hydrophobic layer, where the part of the hydrophobic layer is in the detection region.

Further, after the forming the dielectric layer covering the first electrode and the second electrode, the method includes:

forming a third electrode and a deceleration layer in sequence in a detection region on the dielectric layer, where the third electrode and the deceleration layer are arranged in a stacked manner, and the third electrode is connected to the dielectric layer; and forming a hydrophobic layer covering the dielectric layer and the deceleration layer, and removing a part of the hydrophobic layer, where the part of the hydrophobic layer is in the detection region.

Further, the forming the multiple functional films on the base substrate includes:

forming a passivation layer on the base substrate, and forming a groove in the passivation layer at a position corresponding to the detection region; and forming an organic layer covering the passivation layer and the groove;

the forming the first electrode and the second electrode on the multiple functional films, the first electrode and the second electrode being arranged in the same layer, includes:

forming the first electrode and the second electrode on the organic layer, where the first electrode and the second electrode are arranged in the same layer.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

In the related technologies, combined utilization of functions of microfluidic devices and a variety of detection devices has been realized successfully, such as matrix-assisted laser desorption/ionization mass spectrometry, surface plasmon resonance (SPR), and fluorescence detection. However, in combined utilization, the microfluidic device and the detection device are separated from each other, and the large size of the detection device makes it impossible to integrate with the microfluidic device with a small size in the same chip.

In view of the above, the present disclosure provides a micro total analysis system, an operating method and a manufacturing method thereof, which can solve the problem in the related technologies that, the microfluidic device and the detection device are separated from each other, the detection device has a large size and the microfluidic device and the detection device cannot be integrated in the same chip.

Figure 1:
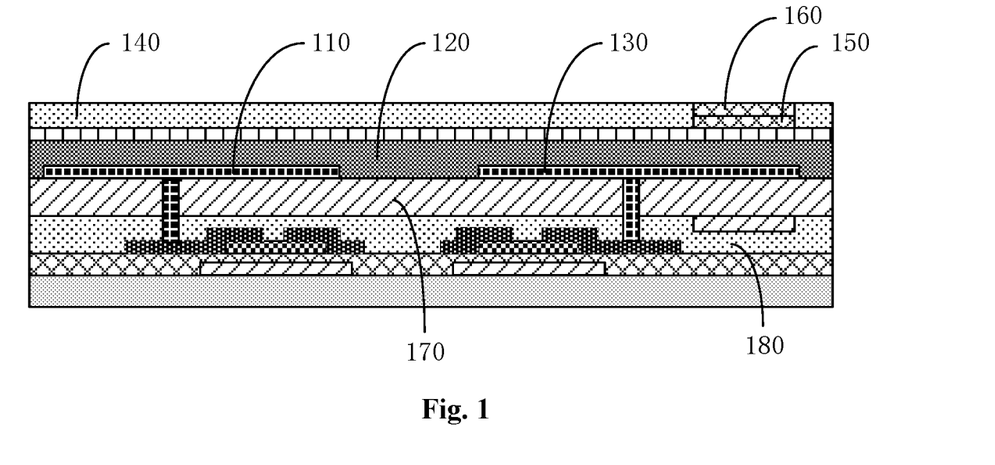
FIG. 1 is a sectional view of a micro total analysis system according to an embodiment of the present disclosure.

The present disclosure provides a micro total analysis system. As shown in FIG. 1, the micro total analysis system includes at least one micro total analysis unit. Each micro total analysis unit includes:

a microfluidic device, which includes a first electrode 110 and a dielectric layer 120 connected to each other, and the dielectric layer 120 is configured to drive a to-be-measured droplet to move based on a voltage of the first electrode 110; and an acoustic wave detection device, which includes a second electrode 130 connected to the dielectric layer 120, the dielectric layer 120 is reused as a transducer of the acoustic wave detection device, and is configured to generate an acoustic wave toward the to-be-measured droplet based on a voltage of the second electrode 130, and generate a detection result corresponding to the to-be-measured droplet based on a received acoustic wave.

In the embodiments of the present disclosure, the dielectric layer in each micro total analysis unit can be used as a part of the microfluidic device to drive the to-be-measured droplet to move based on the voltage of the first electrode, and can also be used as a part of the acoustic wave detection device to generate the acoustic wave toward the to-be-measured droplet based on the voltage of the second electrode, and generate the detection result corresponding to the to-be-measured droplet based on the received acoustic wave, thereby realizing integration of the microfluidic device and the acoustic wave detection device in the same chip. Therefore, the technical solution according to the present disclosure enables the microfluidic device and the acoustic wave detection device to be integrated in the same chip.

In the embodiments of the present disclosure, as shown in FIG. 1, two thin-film transistors (TFT) are formed on a base substrate of each micro total analysis unit, one of the TFTs is a driving TFT, and the other of the TFTs is a detection TFT. The driving TFT is connected to the first electrode 110 and is configured to provide, a voltage for driving the droplet to move, to the first electrode 110 in a case that an electrical connection between a source of the driving TFT and a drain of the driving TFT are turned on. The detection TFT is connected to the second electrode 130 and is configured to provide, a voltage for causing the dielectric layer 120 to emit the acoustic wave, to the second electrode 130 in a case that an electrical connection between a source of the detection TFT and a drain of the detection TFT are turned on. The above two TFTs may be manufactured by a back channel etch (BCE) process, or may be manufactured by an amorphous silicon (a-Si) process.

The first electrode 110 and the second electrode 130 are located on a side of the two TFTs facing away from the base substrate, and the dielectric layer 120 covers the first electrode 110 and the second electrode 130, and is connected to the first electrode 110 and the second electrode 130. For example, the acoustic impedance of metal molybdenum (Mo) is 64.2 Mrayl, and both the first electrode 110 and the second electrode 130 may be made of metal Mo.

The first electrode 110 of each micro total analysis unit may be an electrode located only on one side of the to-be-measured droplet, as shown in FIG. 1, so that an electric field for driving the to-be-measured droplet to move is formed between the first electrodes 110 in the multiple micro total analysis units, and then the to-be-measured droplet is driven to move in the micro total analysis system.

The first electrode 110 of each micro total analysis unit may be two electrodes disposed on opposite sides of the to-be-measured droplet, an electric field for driving the to-be-measured droplet to move is formed between the two electrodes, and then the to-be-measured droplet is driven to move in the micro total analysis unit.

In the embodiments of the present disclosure, the dielectric layer 120 has a dielectric property. The dielectric layer 120 is polarized after receiving the voltage provided by the first electrode 110. According to the principle that the like charges repel each other, the polarized dielectric layer 120 can apply a repulsive force to the to-be-measured droplet so as to drive the to-be-measured droplet to move. In addition, increase in charge density results in increase in the repulsive force, improving the driving force on the to-be-measured droplet, and realizing the effect that the first electrode 110 can drive the to-be-measured droplet to move with a low driving voltage.

In the embodiments of the present disclosure, the dielectric layer 120 also has a piezoelectric property. The dielectric layer 120 may generate vibration under control of the voltage of the second electrode 130 to emit the acoustic wave, i.e., acting as the transducer of the acoustic wave detection device; and may also generate a voltage signal corresponding to the acoustic wave when vibrated by the acoustic wave, i.e., acting as a detector.

In the case where the first electrode 110 is located only on one side of the to-be-measured droplet, as shown in FIG. 1, the dielectric layer 120 is located on the same side of the to-be-measured droplet. In this case, the dielectric layer 120 emits an acoustic wave and receives an acoustic wave in a time division manner. In emitting the acoustic wave, the dielectric layer 120 generates, according to the voltage provided by the second electrode 130, vibration to emit the acoustic wave; and in receiving the acoustic wave, the second electrode 130 does not provide voltage to the dielectric layer 120, and the dielectric layer 120 vibrates to deform according to the received acoustic wave, so as to obtain the corresponding voltage signal.

In a case where the first electrode 110 includes two electrodes on opposite sides of the to-be-measured droplet, the dielectric layer 120 includes two dielectric layers 120 on opposite sides of the to-be-measured droplet, and each of the two dielectric layers 120 is located between the to-be-measured droplet and the electrode. One of the dielectric layers 120 is configured to generate vibration according to the voltage provided by the second electrode 130 so as to emit an acoustic wave, while the other of the dielectric layers 120 is configured to vibrate according to a received acoustic wave so as to generate deformation, thereby obtaining the corresponding voltage signal.

In the case where the dielectric layer 120 is located on only one side of the to-be-measured droplet, the emitted acoustic wave needs to be reflected back to the dielectric layer 120 from the other side of the to-be-measured droplet. The acoustic wave will be reflected at an interface of two media with different acoustic impedances, the reflection coefficient of the acoustic wave is $R=(Z1-Z2)/(Z1+Z2)$, and the transmission coefficient of the acoustic wave is $T=2Z2/(Z2+Z1)$, where $Z1$ and $Z2$ are the acoustic impedances of the two media. It can be seen that, in order to improve the reflection effect of the acoustic wave, the larger the acoustic impedance ratio of the two media which are for reflecting the acoustic wave back to the dielectric layer 120 and are on the other side of the to-be-measured droplet, the better the effect.

Further, the dielectric constant of the dielectric layer 120 may be greater than 9.

In the embodiments, the dielectric layer 120 may be made of polyvinylidene fluoride (PVDF), or may be made of polyvinylidene fluoride copolymer (PVDF-TrFE). PVDF and PVDF-TrFE have both piezoelectric and dielectric properties.

The dielectric constant of the dielectric layer 120 being greater than 9 enables the first electrode 110 to drive the to-be-measured droplet to move with a smaller driving voltage, saving power consumption of the micro total analysis system.

Further, as shown in FIG. 1, the micro total analysis unit further includes a hydrophobic layer 140, the hydrophobic layer 140 is located on a side of the dielectric layer 120 facing the to-be-measured droplet, and the hydrophobic layer 140 is in contact with the to-be-measured droplet.

Based on the contact of the hydrophobic layer 140 with the to-be-measured droplet, the dielectric layer 120 is actually used to drive the to-be-measured droplet to move on the hydrophobic layer 140 based on the voltage of the first electrode 110. Since the hydrophobic layer 140 can reduce the movement resistance of the to-be-measured droplet, the movement of the to-be-measured droplet is more agile.

In the embodiments, the hydrophobic layer 140 may be made of Teflon, and the thickness may range from 200 nm to 800 nm. The Teflon film, which has an ultra-hydrophobic property, covers a surface in the micro total analysis system that is in contact with the to-be-measured droplet.

Further, the hydrophobic layer 140 includes a through hole provided in the detection region, a third electrode 150 connected to the dielectric layer 120 is provided in the through hole, and the third electrode 150 is configured to cause the acoustic wave generated by the dielectric layer 120 to be emitted toward a part of the to-be-measured droplet, where the part of the to-be-measured droplet is located in the detection region.

In the embodiments, the detection region is a preset region for acoustic waves to pass through the to-be-measured droplet in a concentrated manner, and the third electrode 150 is configured to cause acoustic waves generated by the dielectric layer 120 to be emitted toward the detection region in a concentrated manner, so that the acoustic waves can pass through a part of the to-be-measured droplet that is located in the detection region, which improves utilization rate of acoustic waves, and then improves detection accuracy of the to-be-measured droplet by the acoustic wave detection device.

In the embodiments, the third electrode 150 may be made of metal Mo.

Further, the micro total analysis unit further includes a deceleration layer 160 on a side of the third electrode 150 facing the to-be-measured droplet, and the deceleration layer 160 is configured to reduce the movement speed of the to-be-measured droplet on the deceleration layer 160.

Since the movement resistance of the to-be-measured droplet on the hydrophobic layer 140 is small, the speed of the to-be-measured droplet on the hydrophobic layer 140 is relatively fast, and the time for the droplet to pass through the detection region will be short when acoustic waves are focused in the detection region, resulting in reduction in detection accuracy.

In the embodiments, the deceleration layer 160 is provided in the detection region to increase the movement resistance of the to-be-measured droplet in the detection region, thereby reducing the movement speed of the to-be-measured droplet on the deceleration layer 160, and then realizing the purpose of extending the duration for which the to-be-measured droplet passes through the detection region. In this way, the acoustic wave can pass through the to-be-measured droplet for a relative long time, improving the detection accuracy of the to-be-measured droplet.

The surface of the deceleration layer 160 may be flush with the surface of the hydrophobic layer 140. In the embodiments, the deceleration layer 160 may be a thin metal layer, such as an Au film (film of element gold).

Further, the micro total analysis unit further includes an organic layer 170 and a passivation layer 180 which are disposed in sequence on a side of the first electrode 110 facing away from the to-be-measured droplet, a groove is provided in the passivation layer 180 at a position corresponding to the detection region, and the groove is filled with the organic layer.

Figure 2:
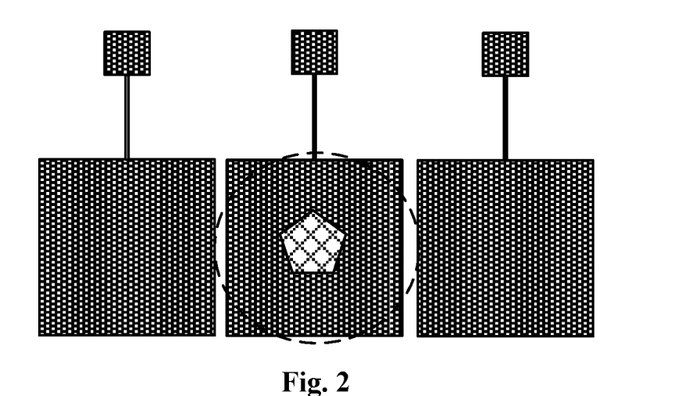
FIG. 2 is a schematic diagram of an acoustic wave transmission path in a micro total analysis system according to another embodiment of the present disclosure.

The passivation layer (PVX) 180 is an insulating layer, for example, an inorganic insulating layer or an organic insulating layer. The passivation layer 180 is provided with the groove for optimizing the quality of the acoustic wave, thereby improving sensitivity of acoustic wave detection. The acoustic wave transmission path in the embodiments is shown in FIG. 2, the upper part of FIG. 2 is the groove, the lower pentagon in FIG. 2 is the detection region, and the circular dotted line represents the to-be-measured droplet.

In the embodiments, the organic layer 170 is made of a flexible material, such as resin material (Resin), polyimide (PI) material, parylene, or polyethylene terephthalate (PET).

The organic layer 170 is made of a flexible material, and its acoustic impedance is close to that of air. By filling the groove with the flexible material, the leakage of acoustic wave can be better limited; in addition, difficulty of process is reduced, and normal operation of the acoustic wave detection device is ensured.

The width of the groove may be designed to be 3 mm to 5 mm, and the depth of the groove may be designed to be 0.1 µm to 1 µm.

Further, the thickness of the organic layer 170 is greater than 10 microns.

When the flexible material is combined with the rigid material, the thickness of the flexible material has a critical value for acoustic wave attenuation. If the acoustic wave energy is not fully attenuated when the propagation distance of the acoustic wave in the flexible material is less than the critical value, the acoustic wave will leak out from the flexible material, the leaked acoustic wave will be reflected when it reaches the interface between the flexible material and the rigid material, and the reflected acoustic wave will form a resonance, which is beyond the fundamental frequency, with the acoustic wave inside the flexible material, the resonance being a parasitic interference that reduces the accuracy of acoustic wave detection. If the acoustic wave energy is completely attenuated when the propagation distance of the acoustic wave in the flexible material is greater than the critical value, the acoustic wave will not leak out from the flexible material, which achieves suppressing of parasitic interference and improves the accuracy of acoustic wave detection.

In the embodiments, the thickness of the organic layer 170 is designed to be greater than 10 mm, so that the propagation distance of the acoustic wave in the flexible material is greater than the critical value, thereby achieving the effect of ensuring the accuracy of acoustic wave detection.

Further, the frequency of the acoustic wave ranges from 25 to 40 kHz, and the wavelength of the acoustic wave ranges from 8.5 to 13.6 mm.

In the embodiments, an ultrasonic wave is used for acoustic wave detection. However, high-frequency ultrasonic wave will quickly attenuate in the air and cause harm to the human body. Therefore, the frequency of the acoustic wave used for detection in the embodiments is between 25-40 kHz, and the wavelength is between 8.5-13.6 mm.

Further, the quantity of the micro total analysis unit is plural, the multiple micro total analysis units are arranged in an array, and the distance between the centers of two adjacent grooves is less than or equal to half of the wavelength of the acoustic wave.

The directivity of the directional sound is related to the wavelength of the acoustic wave and the size of the transducer. When the diameter of the acoustic source is much smaller than the wavelength of the acoustic wave, the acoustic wave does not have an obvious directivity. When the diameter of the acoustic source approaches the wavelength of the acoustic wave, the acoustic wave shows a relatively strong directivity. When the diameter of the acoustic source is much larger than the wavelength of the acoustic wave, the acoustic wave has a very strong directivity.

The size of the acoustic source as described above refers to the size of the transducer. The directivity of the acoustic wave will be strengthened when the transducer is large, however, there will be several side lobes in addition to the main lobe with the largest radiation intensity. These side lobes cause the spread of the energy of the acoustic wave, resulting in attenuation of the acoustic wave and reducing sensitivity of the acoustic wave detection. Therefore, in the embodiments, an acoustic wave with a relative long wavelength may be selected for acoustic wave detection. In this case, the size of the transducer may be designed to be less than or equal to half of the wavelength to enhance the directivity of the acoustic wave.

Figure 3:
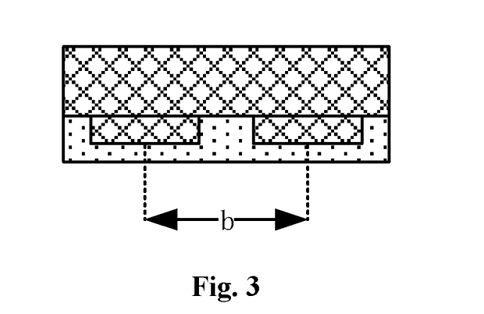
FIG. 3 is a schematic diagram of a distance between grooves in a micro total analysis system according to another embodiment of the present disclosure.

In addition, as shown in FIG. 3, the distance b between the centers of two adjacent grooves is designed to be less than or equal to half the wavelength of the acoustic wave, which can also effectively suppress side lobes.

Figure 7:
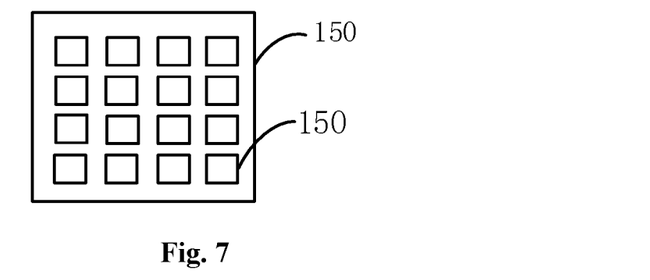
FIG. 7 is a schematic diagram of a micro total analysis system including multiple micro total analysis units arranged in an array according to another embodiment of the present disclosure.

As shown in FIG. 7, the micro total analysis system 20 includes multiple micro total analysis units 30, the multiple micro total analysis units 30 are arranged in an array, and the quantity of transducers simultaneously covered by a to-be-measured droplet is greater than or equal to 6.

When an ultrasonic wave with a short wavelength is adopted for acoustic wave detection, the directivity of the acoustic wave can be improved by adding a point acoustic source array. In the embodiments, by reducing the size of the micro total analysis unit, the quantity of transducers simultaneously covered by the same to-be-measured droplet is greater than or equal to 6, so that the same to-be-measured droplet may have an array of at least 6 point acoustic sources, which ensures the directivity of the acoustic wave, and in turn ensures the accuracy and sensitivity of acoustic wave detection.

Figure 4:
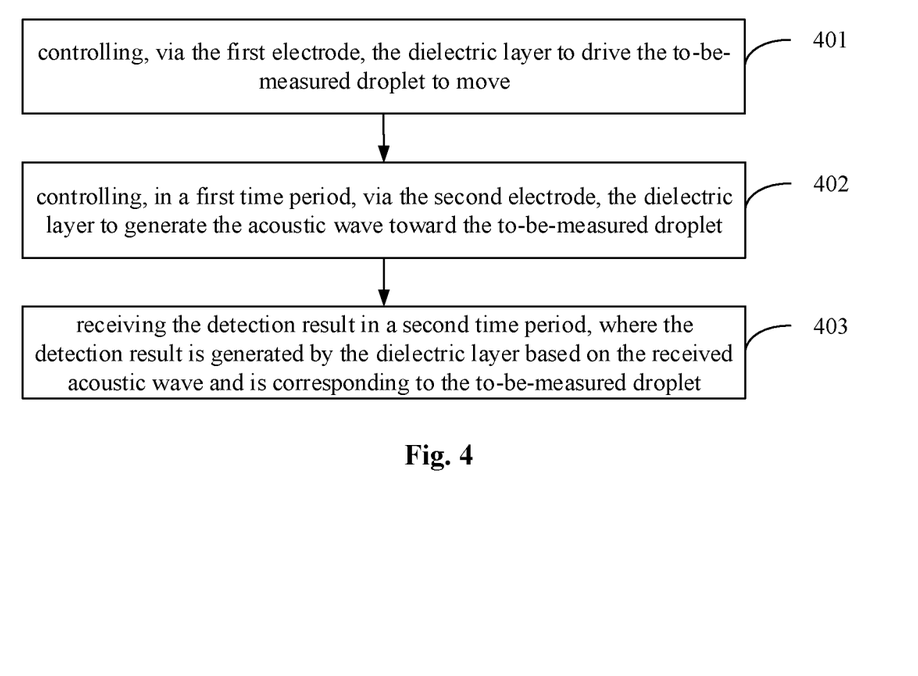
FIG. 4 is a flowchart of an operating method for a micro total analysis system according to an embodiment of the present disclosure.

The present disclosure also provides an operating method for a micro total analysis system, as shown in FIG. 4, including:

step 401: controlling, via the first electrode, the dielectric layer to drive the to-be-measured droplet to move;

step 402: controlling, in a first time period, via the second electrode, the dielectric layer to generate the acoustic wave toward the to-be-measured droplet; and step 403: receiving the detection result in a second time period, where the detection result is generated by the dielectric layer based on the received acoustic wave and is corresponding to the to-be-measured droplet.

In the embodiments of the present disclosure, the dielectric layer in each micro total analysis unit can be used as a part of the microfluidic device to drive the to-be-measured droplet to move based on the voltage of the first electrode, and can also be used as a part of the acoustic wave detection device to generate the acoustic wave toward the to-be-measured droplet based on the voltage of the second electrode, and generate the detection result corresponding to the to-be-measured droplet based on the received acoustic wave, thereby realizing integration of the microfluidic device and the acoustic wave detection device in the same chip. Therefore, the technical solution according to the present disclosure enables the microfluidic device and the acoustic wave detection device to be integrated in the same chip.

In the embodiments of the present disclosure, as shown in FIG. 1, two TFTs are formed on a base substrate of each micro total analysis unit, one of the TFTs is a driving TFT, and the other of the TFTs is a detection TFT. The driving TFT is connected to the first electrode and is configured to provide, a voltage for driving the droplet to move, to the first electrode. The detection TFT is connected to the second electrode and is configured to provide, a voltage for causing the dielectric layer to emit the acoustic wave, to the second electrode. The two TFTs in the above may be manufactured by a back channel etch (BCE) process, or may be manufactured by an amorphous silicon (a-Si) process.

The first electrode and the second electrode are located on a side of the two TFTs, the side facing away from the base substrate. The dielectric layer covers the first electrode and the second electrode, and is connected to the first electrode and the second electrode. For example, the acoustic impedance of metal molybdenum (Mo) is 64.2 Mrayl, and both the first electrode and the second electrode may be made of metal Mo.

The first electrode of each micro total analysis unit may be an electrode located only on one side of the to-be-measured droplet, as shown in FIG. 1, so that an electric field for driving the to-be-measured droplet to move is formed between the first electrodes in the multiple micro total analysis units, and then the to-be-measured droplet is driven to move in the micro total analysis system.

The first electrode of each micro total analysis unit may be two electrodes disposed on two opposite sides of the to-be-measured droplet, an electric field for driving the to-be-measured droplet to move is formed between the two electrodes, and then the to-be-measured droplet is driven to move in the micro total analysis unit.

In the embodiments of the present disclosure, the dielectric layer has a dielectric property. The dielectric layer is polarized after receiving the voltage provided by the first electrode. According to the principle that the like charges repel each other, the polarized dielectric layer can apply a repulsive force to the to-be-measured droplet so as to drive the to-be-measured droplet to move. In addition, increase in charge density results in increase in the repulsive force, improving the driving force on the to-be-measured droplet and realizing the effect that the first electrode can drive the to-be-measured droplet to move with a low driving voltage.

In the embodiments of the present disclosure, the dielectric layer also has a piezoelectric property. The dielectric layer may generate vibration under control of the voltage of the second electrode to emit the acoustic wave, i.e., acting as the transducer of the acoustic wave detection device; and may also generate a voltage signal corresponding to the acoustic wave when vibrated by the acoustic wave, i.e., acting as a detector.

In the case where the first electrode is located only on one side of the to-be-measured droplet, as shown in FIG. 1, the dielectric layer is located on the same side of the to-be-measured droplet. In this case, the dielectric layer emits an acoustic wave and receives an acoustic wave in a time division manner (that is, the first time period and the second time period are different time periods). In emitting the acoustic wave, the dielectric layer generates, according to the voltage provided by the second electrode, vibration to emit the acoustic wave; and in receiving the acoustic wave, the second electrode 130 does not provide voltage to the dielectric layer, and the dielectric layer vibrates to deform according to the received acoustic wave, so as to obtain the corresponding voltage signal.

In a case where the first electrode includes two electrodes on two opposite sides of the to-be-measured droplet, the dielectric layer includes two dielectric layers on two opposite sides of the to-be-measured droplet, and each of the two dielectric layers is located between the to-be-measured droplet and the electrode. One of the dielectric layers is configured to generate vibration according to the voltage provided by the second electrode so as to emit an acoustic wave, while the other of the dielectric layers is configured to vibrate according to a received acoustic wave so as to generate deformation (that is, the first time period and the second time period may be the same time period), thereby obtaining the corresponding voltage signal.

In the case where the dielectric layer is located on only one side of the to-be-measured droplet, the emitted acoustic wave needs to be reflected back to the dielectric layer from the other side of the to-be-measured droplet. The acoustic wave will be reflected at an interface of two media with different acoustic impedances, the reflection coefficient of the acoustic wave is $R=(Z1-Z2)/(Z1+Z2)$, and the transmission coefficient of the acoustic wave is $T=2Z2/(Z2+Z1)$, where Z1 and Z2 are the acoustic impedances of the two media. It can be seen that, in order to improve the reflection effect of the acoustic wave, the larger the acoustic impedance ratio of the two media which are for reflecting the acoustic wave back to the dielectric layer and are on the other side of the to-be-measured droplet, the better the effect.

Further, in a case that the micro total analysis unit further includes a hydrophobic layer, the hydrophobic layer is located on a side of the dielectric layer, the side facing the to-be-measured droplet, and the hydrophobic layer is in contact with the to-be-measured droplet, and that the hydrophobic layer includes a through hole provided in the detection region, a third electrode connected to the dielectric layer is provided in the through hole, and the third electrode is configured to cause the acoustic wave generated by the dielectric layer to be emitted toward a part of the to-be-measured droplet, the part of the to-be-measured droplet being located in the detection region:

the controlling, via the first electrode, the dielectric layer to drive the to-be-measured droplet to move, includes:

controlling, via the first electrode, the dielectric layer to drive the to-be-measured droplet on the hydrophobic layer to move to the detection region; and the controlling, via the second electrode, the dielectric layer to generate the acoustic wave toward the to-be-measured droplet, includes:

controlling, via the second electrode, the dielectric layer to generate the acoustic wave; and controlling the third electrode to cause the acoustic wave generated by the dielectric layer to be transmitted to a part of the to-be-measured droplet, wherein the part of the to-be-measured droplet is in the detection region.

Based on the contact of the hydrophobic layer with the to-be-measured droplet, the dielectric layer is actually used to drive the to-be-measured droplet to move on the hydrophobic layer based on the voltage of the first electrode. Since the hydrophobic layer can reduce the movement resistance of the to-be-measured droplet, the movement of the to-be-measured droplet is more agile.

In the embodiments, the hydrophobic layer may be made of Teflon, and the thickness may range from 200 nm to 800 nm. The Teflon film, which has an ultra-hydrophobic property, covers a surface in the micro total analysis system, where the surface is in contact with the to-be-measured droplet.

In the embodiments, the detection region is a preset region for acoustic waves to pass through the to-be-measured droplet in a concentrated manner, and the third electrode is configured to cause acoustic waves generated by the dielectric layer to be emitted toward the detection region in a concentrated manner, so that the acoustic waves can pass through a part of the to-be-measured droplet that is located in the detection region, which improves utilization rate of acoustic waves, and then improves detection accuracy of the to-be-measured droplet by the acoustic wave detection device.

In the embodiments, the third electrode may be made of metal Mo.

Figure 5:
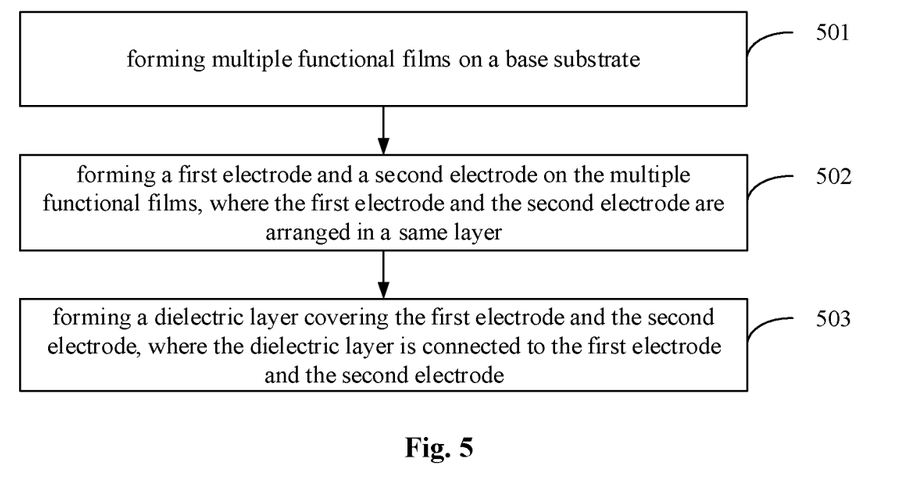
FIG. 5 is a flowchart of a method for manufacturing a micro total analysis system according to an embodiment of the present disclosure.

The present disclosure also provides a method for manufacturing a micro total analysis system. The method includes:

step 501: forming multiple functional films on a base substrate;

step 502: forming a first electrode and a second electrode on the multiple functional films, wherein the first electrode and the second electrode are arranged in a same layer; and step 503: forming a dielectric layer covering the first electrode and the second electrode, wherein the dielectric layer is connected to the first electrode and the second electrode.

In the embodiments of the present disclosure, the dielectric layer in each micro total analysis unit can be used as a part of the microfluidic device to drive the to-be-measured droplet to move based on the voltage of the first electrode, and can also be used as a part of the acoustic wave detection device to generate the acoustic wave toward the to-be-measured droplet based on the voltage of the second electrode, and generate the detection result corresponding to the to-be-measured droplet based on the received acoustic wave, thereby realizing integration of the microfluidic device and the acoustic wave detection device in the same chip. Therefore, the technical solution according to the present disclosure enables the microfluidic device and the acoustic wave detection device to be integrated in the same chip.

The base substrate may be a rigid base substrate, such as a quartz substrate or a glass substrate, or a flexible base substrate, such as a polyimide film, which is not limited herein.

Figure 6A:
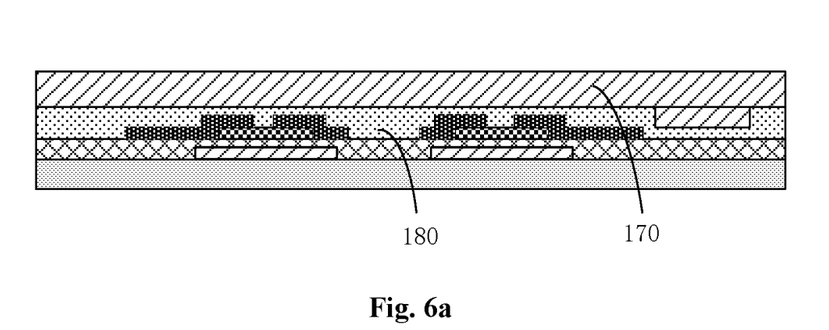
FIG. 6a is a schematic structural diagram at a stage of a method for manufacturing a micro total analysis system according to an embodiment of the present disclosure.

As shown in FIG. 6a, the multiple functional films formed on the base substrate include a gate layer, a gate insulating layer, an active layer, a metal layer, etc., and two thin film transistors (TFTs) are formed in the multiple functional films. One of the TFTs is a driving TFT and the other of the TFTs is a detection TFT. The above two TFTs may be manufactured by a BCE process, or may be manufactured by an a-Si process.

Figure 6B:
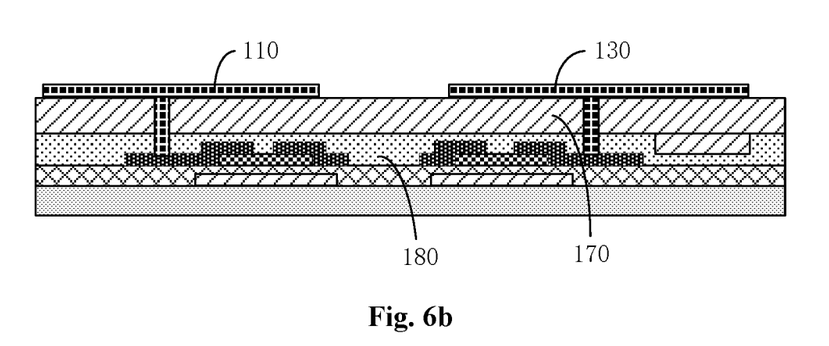
FIG. 6b is a schematic structural diagram at another stage of a method for manufacturing a micro total analysis system according to an embodiment of the present disclosure.

After forming the multiple functional films, the first electrode and the second electrode are formed on the uppermost film of the multiple functional films, as shown in FIG. 6b. The first electrode and the second electrode being arranged in the same layer may be understood as that the first electrode and the second electrode are arranged on the same film. The driving TFT is connected to the first electrode and is configured to provide, a voltage for driving the droplet to move, to the first electrode in a case that an electrical connection between a source of the driving TFT and a drain of the driving TFT are turned on. The detection TFT is connected to the second electrode and is configured to provide, a voltage for causing the dielectric layer to emit the acoustic wave, to the second electrode in a case that an electrical connection between a source of the detection TFT and a drain of the detection TFT are turned on. Both the first electrode and the second electrode may be made of metal Mo.

Figure 6C:
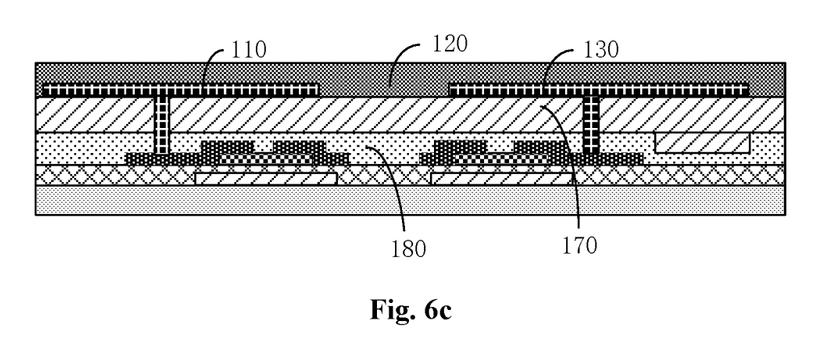
FIG. 6c is a schematic structural diagram at another stage of a method for manufacturing a micro total analysis system according to an embodiment of the present disclosure.

After forming the first electrode and the second electrode, the dielectric layer covering the first electrode and the second electrode may be formed on the first electrode and the second electrode through deposition, coating, printing, etc., as shown in FIG. 6c.

Further, after the forming the dielectric layer covering the first electrode and the second electrode, the method further includes:

forming a third electrode in a detection region on the dielectric layer, wherein the third electrode is connected to the dielectric layer; and forming a hydrophobic layer covering the dielectric layer and the third electrode, and removing a part of the hydrophobic layer, wherein the part of the hydrophobic layer is in the detection region.

Figure 6D:
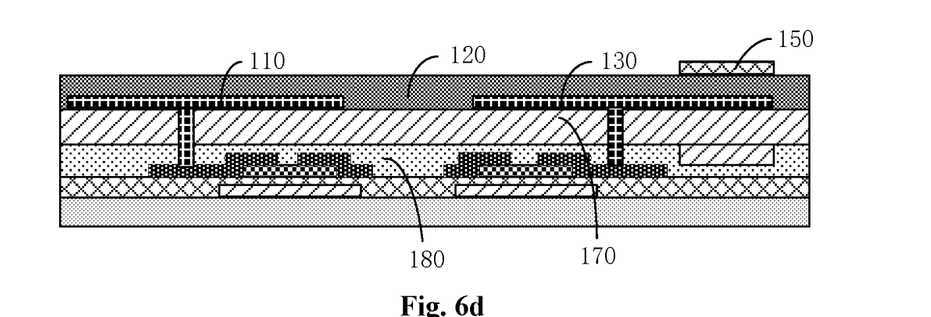
FIG. 6d is a schematic structural diagram at another stage of a method for manufacturing a micro total analysis system according to an embodiment of the present disclosure.

After the dielectric layer is formed, the third electrode may be formed on the dielectric layer in the detection region through deposition or printing, as shown in FIG. 6d. The material of the third electrode may be Mo.

Figure 6E:
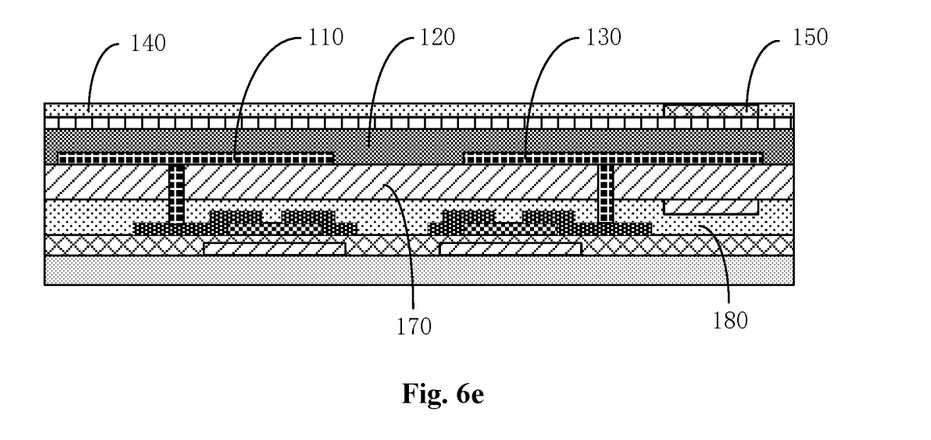
FIG. 6e is a schematic structural diagram at another stage of a method for manufacturing a micro total analysis system according to an embodiment of the present disclosure.

After the third electrode is formed, the hydrophobic layer may be formed through deposition, coating, printing, etc., and after the formation of the hydrophobic layer, the hydrophobic layer located in the detection region is removed through scribing, etching, etc., to expose the third electrode, as shown in FIG. 6e. Optionally, a surface of the third electrode facing the to-be-measured droplet may be flush with a surface of the hydrophobic layer facing the to-be-measured droplet.

Further, after the forming the dielectric layer covering the first electrode and the second electrode, the method further includes:

forming a third electrode and a deceleration layer in sequence in a detection region on the dielectric layer, wherein the third electrode and the deceleration layer are arranged in a stacked manner, and the third electrode is connected to the dielectric layer; and forming a hydrophobic layer covering the dielectric layer and the deceleration layer, and removing a part of the hydrophobic layer, wherein the part of the hydrophobic layer is in the detection region.

After the dielectric layer is formed, the third electrode may be formed on the dielectric layer in the detection region through deposition or printing, as shown in FIG. 6d. The material of the third electrode may be Mo.

Figure 6F:
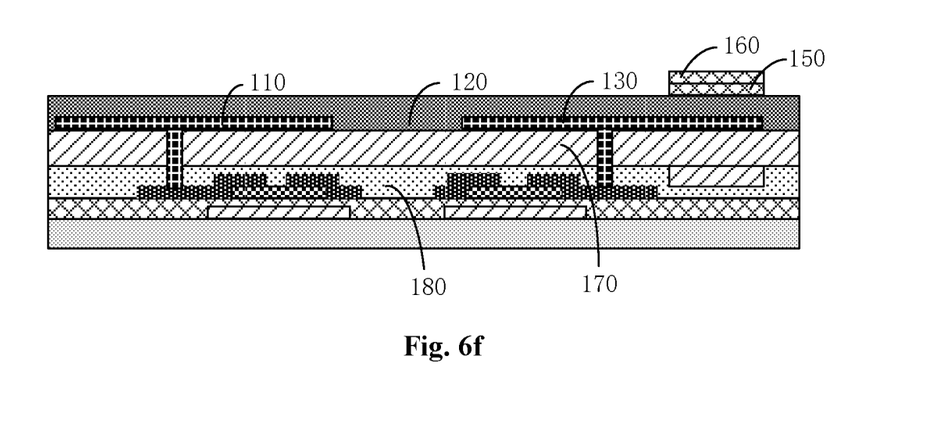
FIG. 6f is a schematic structural diagram at another stage of a method for manufacturing a micro total analysis system according to an embodiment of the present disclosure.

After forming the third electrode, the deceleration layer is formed through sputtering, printing, deposition, etc., as shown in FIG. 6f. The deceleration layer may be a thin metal layer, such as an Au film (film of element gold).

After the deceleration layer is formed, the hydrophobic layer may be formed through deposition, coating, printing, etc., and after the formation of the hydrophobic layer, the hydrophobic layer located in the detection region is removed through scribing, etching, etc., to expose the deceleration layer, as shown in FIG. 1. Optionally, a surface of the deceleration layer facing the to-be-measured droplet may be flush with a surface of the hydrophobic layer facing the to-be-measured droplet.

Further, the forming the multiple functional films on the base substrate includes:

forming a passivation layer on the base substrate, and forming a groove in the passivation layer at a position corresponding to the detection region; and forming an organic layer covering the passivation layer and the groove;

the forming the first electrode and the second electrode on the multiple functional films, the first electrode and the second electrode being arranged in the same layer, includes:

forming the first electrode and the second electrode on the organic layer, wherein the first electrode and the second electrode are arranged in the same layer.

The passivation layer (PVX) is an insulating layer, such as an inorganic insulating layer or an organic insulating layer. It may be obtained by depositing an insulating material. After the flat passivation layer is obtained, the groove may be formed in the detection region through scribing or etching.

After the groove is formed, the organic layer covering the groove and the passivation layer is formed by depositing a flexible material. The flexible material may be resin material (Resin), polyimide (PI) material, parylene or polyethylene terephthalate (PET).

Subsequently, both the first electrode and the second electrode are formed on the organic layer.

Unless otherwise defined, technical terms or scientific terms used in the present disclosure shall have common meanings understood by those ordinary skilled in the art.

Terms such as "first" and "second" in the present disclosure do not indicate any order, quantity or importance, and they are merely used to distinguish different components. Terms such as "include" or "have" indicate that an element or object before such terms covers an element, an object or the equivalent enumerated after such terms, and do not exclude other elements and objects. Terms such as "coupled" and "connected" are not used to limit physical or mechanical connection, they may be direct or indirect electrical connection. Terms such as "above", "below", "left" and "right" are merely to describe relative position relationships, and if an absolute position of a described object changes, relative positions with respect to the described object may change correspondingly.

It can be understood that, if an element such as a layer, a film, a region or a substrate is described to be on or below another element, the element may be directly on or below the another element, or there may be an intermediate element between the element and the another element.

The above descriptions merely illustrate some embodiments of the present disclosure. It should be noted that a person skilled in the art can make various improvements and polishments without departing from the principles of the present disclosure, and these improvements and polishments shall fall within the protection scope of the present disclosure.

What is claimed is:

1. A micro total analysis system, comprising at least one micro total analysis unit, wherein each of the at least one micro total analysis unit comprises:
   a microfluidic device, comprising a first electrode and a dielectric layer connected to each other, wherein the dielectric layer is configured to drive, based on a voltage of the first electrode, a to-be-measured droplet to move; and
   an acoustic wave detection device, comprising a second electrode connected to the dielectric layer, wherein the dielectric layer is further used as a transducer of the acoustic wave detection device, and is configured to generate an acoustic wave toward the to-be-measured droplet based on a voltage of the second electrode, and generate a detection result corresponding to the to-be-measured droplet based on a received acoustic wave,
   wherein the micro total analysis unit further comprises a hydrophobic layer, the hydrophobic layer is on a side of the dielectric layer facing the to-be-measured droplet, and the hydrophobic layer is used for contacting the to-be-measured droplet,
   wherein the hydrophobic layer comprises a through hole provided in a detection region, a third electrode connected to the dielectric layer is provided in the through hole, and the third electrode is configured to cause the acoustic wave generated by the dielectric layer to be transmitted to a part of the to-be-measured droplet, wherein the part of the to-be-measured droplet is in the detection region.

2. The micro total analysis system according to claim 1, wherein the micro total analysis unit further comprises a deceleration layer on a side of the third electrode facing the to-be-measured droplet, and the deceleration the layer is configured to reduce a movement speed of the to-be-measured droplet on the deceleration layer.

3. The micro total analysis system according to claim 1, wherein the micro total analysis unit further comprises an organic layer and a passivation layer arranged in sequence on a side of the first electrode facing away from the to-be-measured droplet, a groove is provided in the passivation layer at a position corresponding to the detection region, and the groove is filled with the organic layer.

4. The micro total analysis system according to claim 3, wherein a width of the groove ranges from 3 millimeters to 5 millimeters, and a depth of the groove ranges from 0.1 microns to 1 microns.

5. The micro total analysis system according to claim 3, including a plurality of micro total analysis units arranged in an array, wherein a distance between centers of two adjacent grooves is less than or equal to half of a wavelength of the acoustic wave.

6. The micro total analysis system according to claim 3, wherein a thickness of the organic layer is greater than 10 microns.

7. The micro total analysis system according to claim 1, wherein a frequency of the acoustic wave ranges from 25 kHz to 40 kHz, and a wavelength of the acoustic wave ranges from 8.5 millimeters to 13.6 millimeters.

8. The micro total analysis system according to claim 1, including a plurality of micro total analysis units arranged in an array, wherein the quantity of the transducers simultaneously covered by one to-be-measured droplet is greater than or equal to 6.

9. The micro total analysis system according to claim 1, wherein a dielectric constant of the dielectric layer is greater than 9.

10. An operating method for the micro total analysis system according to claim 1, the operating method comprising:
controlling, via the first electrode, the dielectric layer to drive the to-be-measured droplet to move;
controlling, in a first time period, via the second electrode, the dielectric layer to generate the acoustic wave toward the to-be-measured droplet; and
receiving the detection result in a second time period, wherein the detection result is generated by the dielectric layer based on the received acoustic wave and is corresponding to the to-be-measured droplet.

11. The operating method according to claim 10, wherein the micro total analysis unit further comprises a hydrophobic layer, the hydrophobic layer is on a side of the dielectric layer facing the to-be-measured droplet, and the hydrophobic layer is used for contacting the to-be-measured droplet;
wherein the hydrophobic layer comprises a through hole provided in a detection region, a third electrode connected to the dielectric layer is provided in the through hole, and the third electrode is configured to cause the acoustic wave generated by the dielectric layer to be transmitted to a part of the to-be-measured droplet, wherein the part of the to-be-measured droplet is in the detection region;
wherein, the controlling, via the first electrode, the dielectric layer to drive the to-be-measured droplet to move, comprises:
controlling, via the first electrode, the dielectric layer to drive the to-be-measured droplet on the hydrophobic layer to move to the detection region; and
wherein, the controlling, via the second electrode, the dielectric layer to generate the acoustic wave toward the to-be-measured droplet, comprises:
controlling, via the second electrode, the dielectric layer to generate the acoustic wave; and
controlling the third electrode to cause the acoustic wave generated by the dielectric layer to be transmitted to a part of the to-be-measured droplet, wherein the part of the to-be-measured droplet is in the detection region.

12. A method for manufacturing a micro total analysis system, comprising:
forming a plurality of functional films on a base substrate;
forming a first electrode and a second electrode on the plurality of functional films, wherein the first electrode and the second electrode are arranged in a same layer; and
forming a dielectric layer covering the first electrode and the second electrode, wherein the dielectric layer is connected to the first electrode and the second electrode,
wherein after the forming the dielectric layer covering the first electrode and the second electrode, the method further comprises:
forming a third electrode in a detection region on the dielectric layer, wherein the third electrode is connected to the dielectric layer; and
forming a hydrophobic layer covering the dielectric layer and the third electrode, and removing a part of the hydrophobic layer, wherein the part of the hydrophobic layer is in the detection region.

13. The method according to claim 12, wherein after the forming the dielectric layer covering the first electrode and the second electrode, the method further comprises:
forming a third electrode and a deceleration layer in sequence in a detection region on the dielectric layer, wherein the third electrode and the deceleration layer are arranged in a stacked manner, and the third electrode is connected to the dielectric layer; and
forming a hydrophobic layer covering the dielectric layer and the deceleration layer, and removing a part of the hydrophobic layer, wherein the part of the hydrophobic layer is in the detection region.

14. The method according to claim 12, wherein the forming the plurality of functional films on the base substrate comprises:
forming a passivation layer on the base substrate, and forming a groove in the passivation layer at a position corresponding to the detection region; and
forming an organic layer covering the passivation layer and the groove;
wherein, the forming the first electrode and the second electrode on the plurality of functional films, the first electrode and the second electrode being arranged in the same layer, comprises:
forming the first electrode and the second electrode on the organic layer, wherein the first electrode and the second electrode are arranged in the same layer.

15. The micro total analysis system according to claim 4, including a plurality of micro total analysis units arranged in an array, wherein a distance between centers of two adjacent grooves is less than or equal to half of a wavelength of the acoustic wave.

16. A micro total analysis system, comprising at least one micro total analysis unit, wherein each of the at least one micro total analysis unit comprises:
a microfluidic device, comprising a first electrode and a dielectric layer connected to each other, wherein the dielectric layer is configured to drive, based on a voltage of the first electrode, a to-be-measured droplet to move; and
an acoustic wave detection device, comprising a second electrode connected to the dielectric layer, wherein the dielectric layer is further used as a transducer of the acoustic wave detection device, and is configured to generate an acoustic wave toward the to-be-measured droplet based on a voltage of the second electrode, and generate a detection result corresponding to the to-be-measured droplet based on a received acoustic wave, wherein the micro total analysis unit further comprises an organic layer and a passivation layer arranged in sequence on a side of the first electrode facing away from the to-be-measured droplet, a groove is provided in the passivation layer at a position corresponding to the detection region, and the groove is filled with the organic layer.

* * * * *